Patented Dec. 14, 1948

2,456,274

UNITED STATES PATENT OFFICE 2,456,274

ARYL THIO-ETHERS OF METAL-CONTAINING PHTHALOCYANINES AND PROCESS FOR PRODUCING SAME

Ernst Gutzwiller, Basel, Switzerland, assignor to Sandoz Ltd., Fribourg, Switzerland, a Swiss firm No Drawing. Application March 15, 1945, Serial No. 583,008. In Switzerland February 14, 1944

Section 1, Public Law 690, August 8, 1946
Patent expires February 14, 1964

12 Claims. (Cl. 260—314.5)

The present invention relates to new dyestuffs of the phthalocyanine series, which are brilliant green pigments possessing an excellent fastness to light, and to a process for their manufacture.

It has been found, that by condensing halogenated phthalocyanines with mercapto compounds of the aromatic series in presence of an alcohol and of a catalyst, new valuable green pigment dyestuffs can be obtained. The halogenophthalocyanines which may be used for the condensation can be prepared by halogenating metal-free or metalliferous phthalocyanines. Furthermore, halogenophthalocyanines prepared by known methods from halogenophthalic acid anhydrides or halogenophthalonitrils like 3- or 4-halogenophthalic acid anhydride, dihalogenophthalic acid anhydride, trihalogenophthalic acid anhydride, tetrahalogenophthalic acid anhydride or 4-chlorophthalonitril etc. may be used. As mercapto compounds I use mono- or polyvalent aliphatic, alicyclic and aromatic mercaptans. In order to carry out the condensation at a lower temperature I use, as reaction medium, mono- or polyvalent alcohols, like methylcyclohexanol, amyl alcohol, octyl alcohol, glycol, diethanolamine, benzyl alcohol, phenylethyl alcohol etc.; preferably high boiling alcohols like benzyl alcohol may be used.

The condensation may be carried out in the following manner in presence or in absence of catalysts, like copper powder or copper salts:

Halogenophthalocyanines are heated, while thoroughly stirring, with aromatic mercapto compounds in the presence of an acid binding agent, like potassium hydroxide, potassium carbonate, sodium hydroxide and the like, and in the presence of an alcohol, whereby it is preferable to first dissolve the alkali metal hydroxides in the alcohol. If during the reaction water becomes produced, it will preferably be distilled off during the operation. The halogenophthalocyanines used may either contain metals or be metal-free. In the case when metal-free halogenophthalocyanines are used, the metallisation can be carried out during the condensation by adding the respective quantity of metals or metal compounds to the reaction mixture.

Instead of free mercapto compounds also their salts can be used; in this case it is possible to carry out the condensation without the addition of acid binding agents. The condensation is carried out at 150°–210° C., preferably at 190°–205° C., and the condensation products can be isolated in various ways; for instance by filtration or by elimination of the alcohol by distilling the same in vacuo or with water-steam. For the filtration it is advantageous to add to the reaction mass some methanol or ethanol and to subsequently wash the reaction product with ethanol and water.

The formation of the new halogen-free green pigments obtainable according to the present invention can be illustrated by the following scheme:

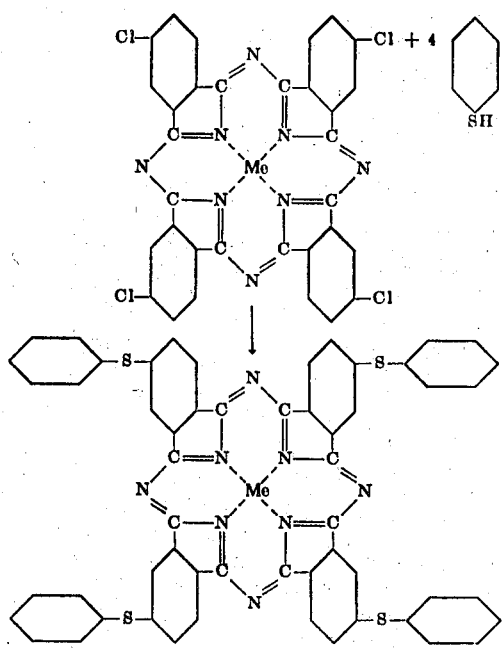

wherein Me stands for a polyvalent metal atom. By using octachloro-derivatives as starting products, all 8 chlorine atoms will be replaced by the mercapto radicals, as far as the quantity of the mercapto compound used is sufficiently large. It is clear that it is possible to replace the halogen atoms only partially or totally by employing different quantities of mercaptanes.

The following examples, without being limitative, illustrate the present invention, the parts being by weight:

*Example 1*

7 parts of a copper phthalocyanine containing 18% of chlorine are stirred, in the presence of 0.2 part of copper powder, at 180°–205° C. with 7.5 parts of thiophenol, 3.8 parts of potassium hydroxide and 50 parts of benzyl alcohol, until the condensation is finished. After cooling down to 80°–100° C. the reaction mass is diluted with 40 parts of ethanol and the dyestuff separated by filtration and washing with ethanol and water. In dry state it is a green powder giving, as pigment on paper, pure green shades.

Example 2

6 parts of potassium hydroxide are dissolved in 40 parts of benzyl alcohol. To this solution are added 10.5 parts of symmetrical copper tetrachlorophthalocyanine (prepared for example by condensation of 4-chlorophthalic acid anhydride with urea and cuprochloride) and 12 parts of p-thiocresol. The reaction mass is now stirred at 190°–205° C. until the reaction is comlete. After dilution at 80°–90° C. with 40 parts of ethanol, the dyestuff is filtered and washed with hot ethanol and hot water. In dry state it is a green pigment giving, on paper, very brilliant yellowish-green shades possessing excellent fastness properties.

The probable formula of the new compound is:

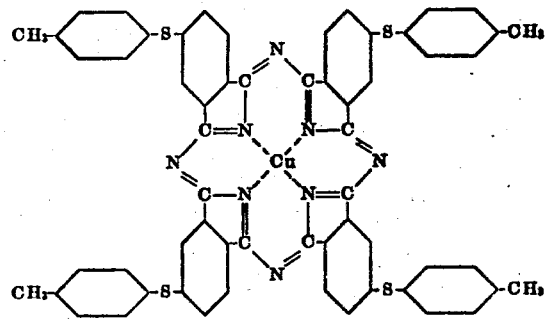

A similar dyestuff will be obtained, when the copper tetrachlorophthalocyanine prepared for instance from 3-chlorophthalic acid anhydride or 3-chlorophthalonitril is used. It is also possible to use mixtures of the above cited phthalocyanines.

By replacing p-thiocresol by a respective quantity of α- or β-thionaphthol, a dyestuff will be obtained that possesses yellow-green shades.

Example 3

9 parts of copper tetrabromophthalocyanine, 8 parts of p-thiocresol, 0.2 part of copper powder, 4 parts of potassium hydroxide and 50 parts of benzyl alcohol are stirred at 150°–205° C., until the condensation is finished. The bromine-free green condensation product is then isolated in the above described manner.

The condensation can also be carried out without addition of copper and, instead of benzyl alcohol, other alcohols can likewise be used. Instead of p-thiocresol, one can use other mercapto compounds, like thiophenol, o-thiocresol, halogenothiophenols, thionaphthol, and the like, whereby the respective mercapto compounds will be obtained. It is also possible to use mixtures of different mercapto compounds or polyvalent mercaptans.

Example 4

7 parts of symmetrical copper tetrachlorophthalocyanine, 8.5 parts of thiophenol, 4.4 parts of potassium hydroxide and 50 parts of benzyl alcohol are stirred, with addition of 0.3 part of copper powder, at 180°–205° C., until the condensation is finished. After dilution at 90°–100° C. with 40 parts of ethanol the dyestuff is filtered, washed with hot ethanol and hot water. In dry state it is a green powder being practically free from chlorine and giving as pigment dyestuff brilliant pure green shades of excellent fastness properties.

Instead of potassium hydroxide the respective quantities of other acid binding agents, like sodium hydroxide, sodium carbonate, potassium carbonate and the like can be used. The copper tetrachlorophthalocyanine may also be replaced by the respective copper tetrabromophthalocyanine.

It is also possible to use the tetrahalogeno-derivatives of other metallophthalocyanines or to use phthalocyanines which are free from metals, whereby condensation products will be obtained which correspond to the derivatives of tetrahalogenophthalocyanines. By adding the necessary quantity of a suitable metal or metal-compound, like copper, cobalt, nickel, iron, copper halides, copper sulphide and the like, to the condensation charge containing a metal-free tetrahalogenophthalocyanine, the respective metallized phthalocyanines will be obtained.

Example 5

7 parts of symmetrical nickel tetrachlorophthalocyanine, 8 parts of p-thiocresol, 4 parts of potassium hydroxide and 40 parts of benzyl alcohol are stirred at 160°–205° C., until the condensation is finished. The practically chlorine-free condensation product thus obtained is separated in the usual manner and constitutes in dry state, a brilliant green pigment.

Instead of nickel tetrachlorophthalocyanine, other tetrachloro-metallophthalocyanines, like cobalt tetrachlorophthalocyanine, iron tetrachlorophthalocyanine and the like, can be used for the condensation.

Example 6

7 parts of symmetrical copper tetrachlorophthalocyanine, 3 parts of p-thiocresol, 1.5 parts of potassium hydroxide and 40 parts of benzyl alcohol are stirred at 195° C., until the condensation is complete. The condensation product isolated in the usual way is a blue-green pigment. If 5 parts of p-thiocresol and 2.5 parts of potassium hydroxide are used, a green pigment dyestuff will be obtained.

Example 7

6 parts of copper octachlorophthalocyanine (prepared e. g. from a technical mixture of 3:4-, 3:6- and 4:5-dichlorophthalic acid anhydrides by condensation with urea and cuprochloride), 10 parts of p-thiocresol, 5 parts of potassium hydroxide and 40 parts of benzyl alcohol are stirred at 190°–205° C., with addition of 0.3 part of copper powder, until the reaction is finished. The yellowish-green condensation product, which is free from chlorine, is separated in the usual way. The probable formula of the new compound is:

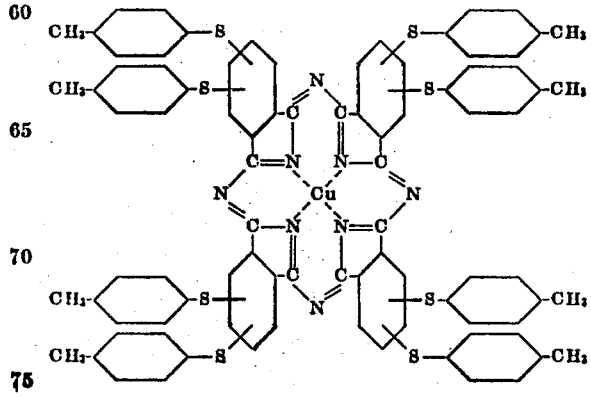

Instead of copper octachlorophthalocyanine, higher halogenated metallized or metal-free phthalocyanine can be used. Furthermore, the thiocresol can be replaced by other mercaptans.

The quantity of the mercaptans used for the condensation may be varied within wide limits, with the condition that the respective quantity of said binding agent must always be added thereto.

What I claim is:

1. A process for the manufacture of pigments of the phthalocyanine series comprising the step of heating at 150–210° C. a phthalocyanine halogenated in the benzene nuclei with an aromatic mercaptan in presence of an acid binding agent and of an alcohol possessing a boiling point of above 150° C.

2. A process for the manufacture of pigments of the phthalocyanine series comprising the step of heating at 150–210° C. a metallized phthalocyanine halogenated in the benzene nuclei with an aromatic mercaptan in presence of an acid binding agent and of an alcohol possessing a boiling point of above 150° C.

3. A process for the manufacture of pigments of the phthalocyanine series comprising the step of heating at 150–210° C. a metallized phthalocyanine halogenated in the benzene nuclei with an aromatic mercaptan in presence of an acid binding agent and of benzyl alcohol.

4. A process for the manufacture of a green pigment of the phthalocyanine series comprising the step of heating to 190–210° C. the copper tetrachlorophthalocyanine with p-thiocresol in the presence of benzyl alcohol and of an alkali metal hydroxide.

5. A process for the manufacture of a green pigment of the phthalocyanine series comprising the step of heating to 190–210° C. the copper octachlorophthalocyanine with p-thiocresol in the presence of benzyl alcohol and of an alkali metal hydroxide.

6. A process for the manufacture of a green pigment of the phthalocyanine series comprising the step of heating to 190–210° C. the nickel tetrachlorophthalocyanine with p-thiocresol in the presence of benzyl alcohol and of an alkali metal hydroxide.

7. The new phthalocyanines of the general formula

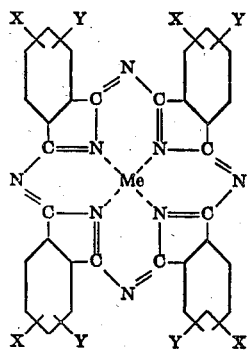

wherein Me stands for a polyvalent metal atom in complex linkage, X stands for the group —S—aryl and Y stands for a member of the group consisting of hydrogen and the group —S—aryl, which phthalocyanines are insoluble in water, but soluble in benzene with a green coloration and which are green pigments possessing excellent fastness properties to light.

8. The new phthalocyanine of the formula

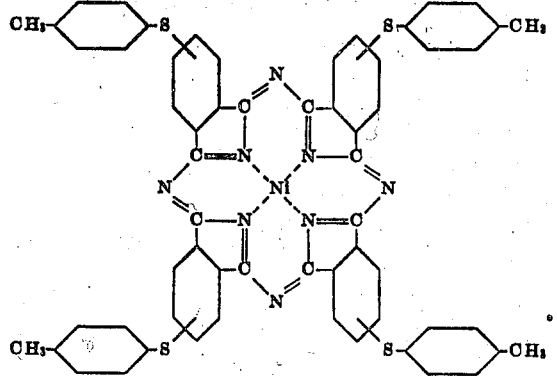

which is a water-insoluble brilliant green pigment possessing an excellent light-fastness.

9. The new phthalocyanines of the general formula

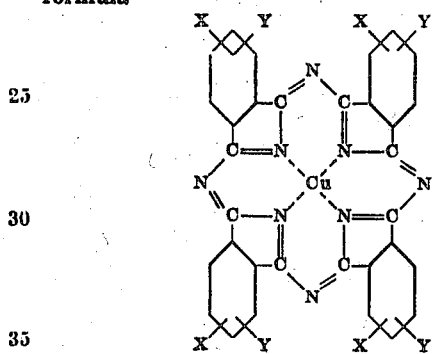

wherein X stands for the group —S—aryl and Y stands for a member selected grom the group consisting of hydrogen and the group —S—aryl, which phthalocyanines are insoluble in water, but soluble in benzene with a green coloration and which are green pigments possessing excellent fastness properties to light.

10 The new phthalocyanine of the formula

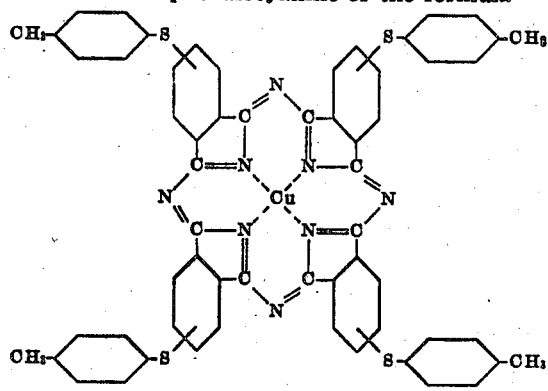

which is a water-insoluble brilliant green pigment possessing an excellent light-fastness.

11. The new phthalocyanine of the formula

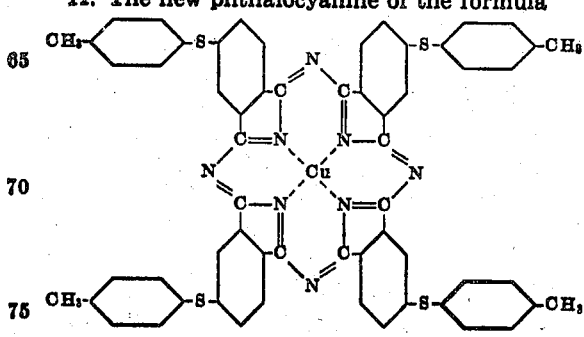

which is a water-insoluble brilliant yellowish-green pigment possessing an excellent fastness to light.

12. The new phthalocyanine of the formula

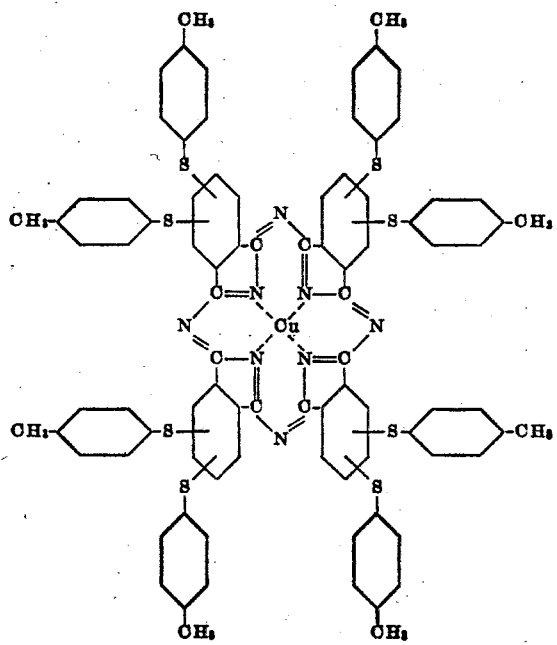

which is a water-insoluble yellowish-green pigment possessing an excellent light-fastness.

ERNST GUTZWILLER.

REFERENCES CITED

The following references are of record in the file of this patent:

UNITED STATES PATENTS

| Number | Name | Date |
| --- | --- | --- |
| 2,285,359 | Rosch et al. | June 2, 1942 |
| 2,290,906 | Coffey et al. | July 28, 1942 |
| 2,342,662 | Haddock | Feb. 29, 1944 |

FOREIGN PATENTS

| Number | Country | Date |
| --- | --- | --- |
| 492,177 | Great Britain | Sept. 15, 1938 |
| 541,146 | Great Britain | Nov. 14, 1941 |
| 544,953 | Great Britain | May 5, 1942 |
| 203,432 | Switzerland | June 16, 1939 |
| 205,538 | Switzerland | Dec. 16, 1939 |
| 217,984 | Switzerland | March 2, 1942 |